United States Patent [19]

Carrier et al.

[11] Patent Number: 5,195,126
[45] Date of Patent: Mar. 16, 1993

[54] EMERGENCY ALERT AND SECURITY APPARATUS AND METHOD

[75] Inventors: Brian Carrier, Mechanicsville, Va.; Kathleen A. Maier, Rockville, Md.

[73] Assignee: Bell Atlantic Network Services, Inc., Alexandria, Va.

[21] Appl. No.: 697,380

[22] Filed: May 9, 1991

[51] Int. Cl.⁵ .......................................... H04M 11/04
[52] U.S. Cl. ...................................... 379/45; 379/46; 379/49; 379/51
[58] Field of Search ................................... 379/39–47, 379/49, 51, 67, 88, 89, 201, 211, 142

[56] References Cited

U.S. PATENT DOCUMENTS

| | | |
|---|---|---|
| 4,219,698 | 8/1980 | Birilli et al. |
| 4,237,344 | 12/1980 | Moore. |
| 4,417,100 | 11/1983 | Carlson et al. |
| 4,491,970 | 1/1985 | LaWhite et al. |
| 4,510,350 | 4/1985 | Wagner. |
| 4,565,902 | 1/1986 | Phillipps et al. |
| 4,602,129 | 7/1986 | Matthews et al. ............ 379/89 |
| 4,881,252 | 11/1989 | Jones et al. |

OTHER PUBLICATIONS

Popular Science, Jun., 1982, "Zap Your Mom" advertisement. May 9, 1991.

Primary Examiner—James L. Dwyer
Assistant Examiner—Wing F. Chan
Attorney, Agent, or Firm—Lowe, Price, LeBlanc & Becker

[57] ABSTRACT

A telecommunications system which includes a 911 and voice message service platform for providing such services as telephone answering, voice mail and call completion. An emergency/safety notification system is incorporated and includes a monitor/router device passively connected to the 911 trunk to detect number identification signals. A first storage is provided with the monitor/router and has stored therein data identifying telephone stations subscribing to the emergency alert service. The monitor/router is connectable to the VMS platform and transmits thereto the identification of subscriber stations whose identity is detected from the 911 trunk. The VMS platform is provided with second storage for storing voice data signals generated by the subscriber stations in addition to data including the identity of destination telephone stations to whom the voice data is to be provided. A switch connects the VMS platform to the destination telephone stations to deliver the voice message data at the command of the subscriber telephone stations. The network is structured to provide both the 911 call and the voice message delivery simultaneously or separately. The delivery may be initiated by manual dialing or auto-dialing under the control of a remote unit containing a radio transmitter and actuating buttons. The system includes apparatus to monitor the delivery of said voice data and upon detecting failure to establish connection to effect such delivery to initiate a call to the subscriber station and/or 911.

18 Claims, 8 Drawing Sheets

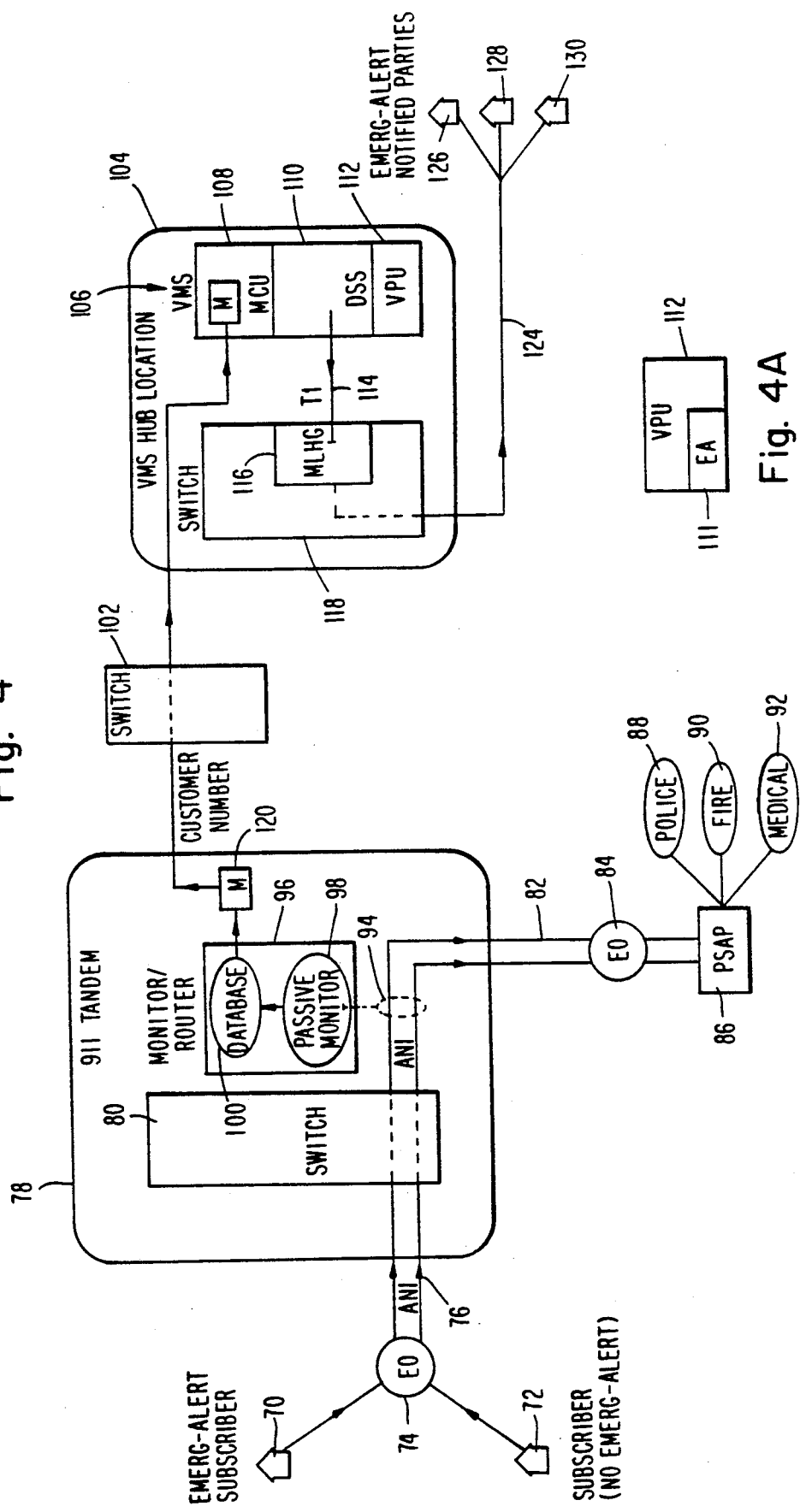

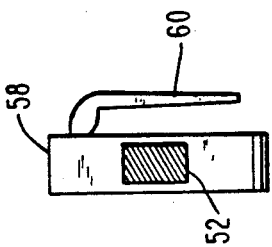
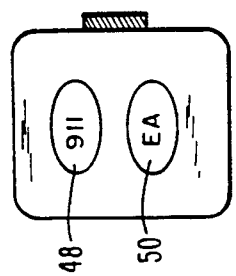
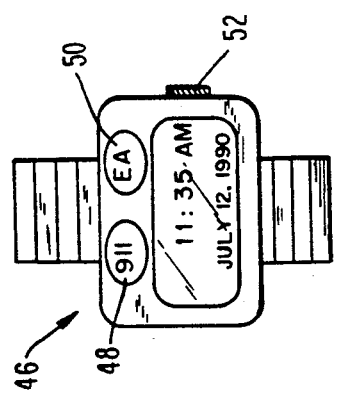
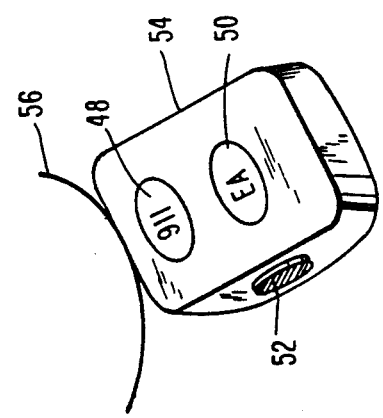
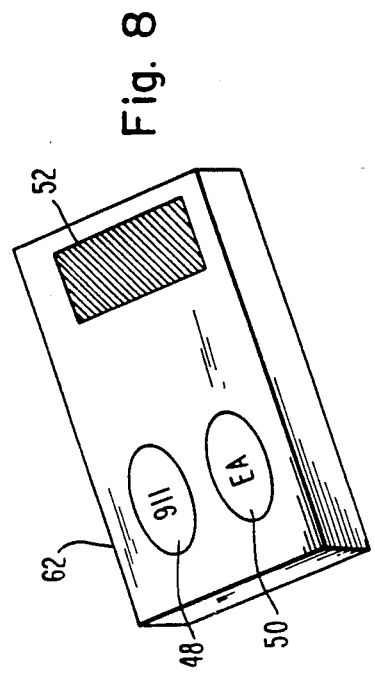
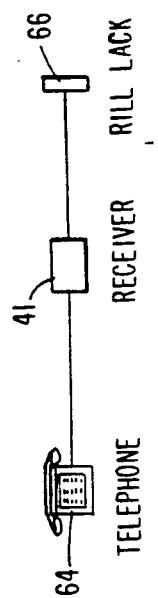

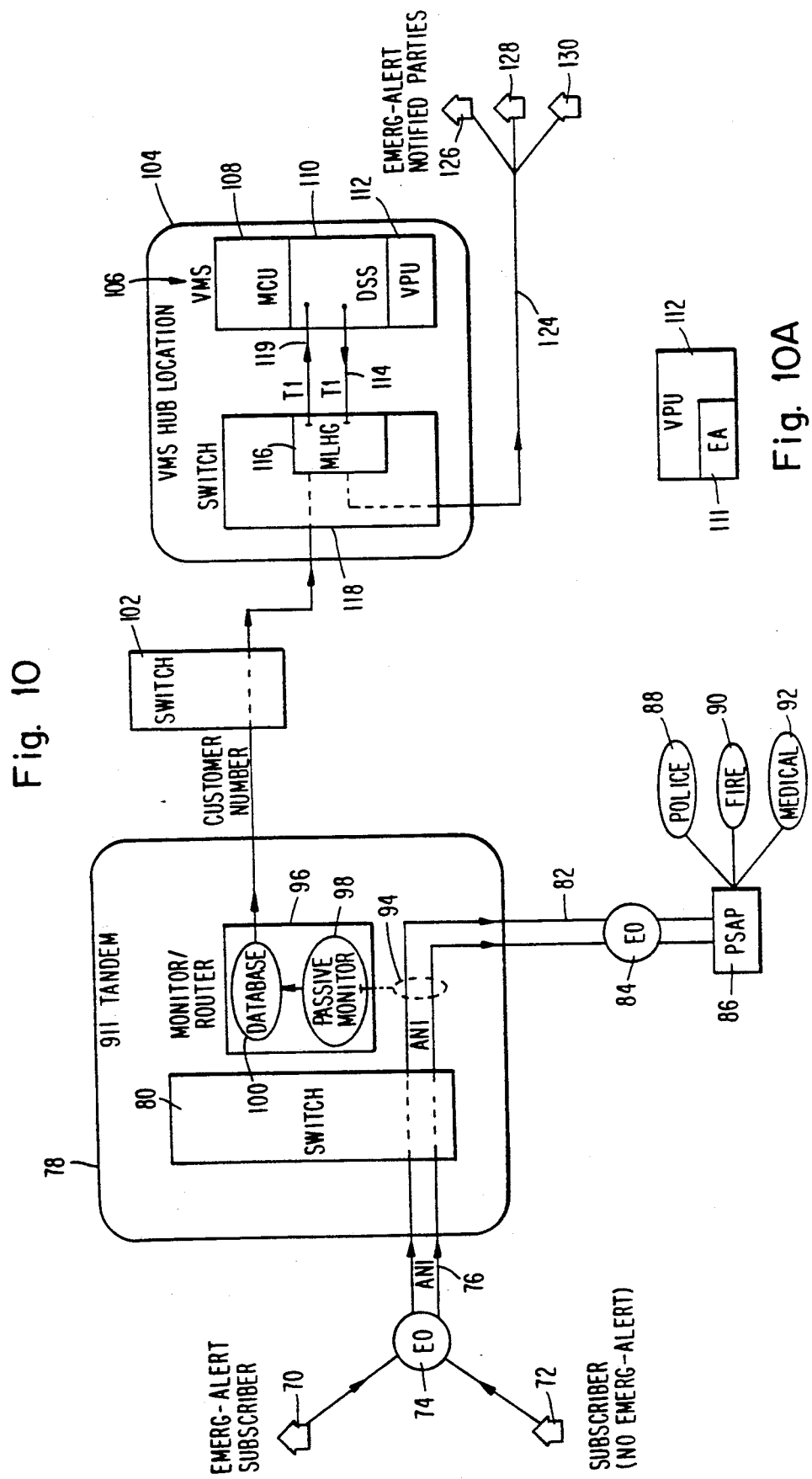

EMERGENCY ALERT AND SECURITY APPARATUS AND METHOD

TECHNICAL FIELD

The present invention relates to safety and security communications systems and, in particular, to such systems integrated with and supplementary to public switched telephone networks providing enhanced telecommunication services.

BACKGROUND ART

There is a recognized need for promptly providing appropriate notification to cognizant entities in the event of the occurrence of emergency or precautionary situations. The now familiar 911 telephone service has evolved in response to the emergency aspect of that need. Other alarm systems utilizing the public switched telephone network have been proposed as exemplified by the following illustrative examples:

Wagner U.S. Pat. No. 4,510,350 describes a personal alarm apparatus capable of being worn in the form of a wristwatch for transmitting a radio frequency alarm signal to actuate a relay station in the customer's home. The relay station is connected to a telephone and upon actuation dials a sequence of telephone numbers and delivers a recorded message. Each transmitter is associated with a relay base unit which contains EPROMs which store a series of different telephone numbers in addition to a recorded voice message. The voice message can be altered. A microprocessor compares the code of the transmitter with the stored code, identifies the subscriber, and retrieves from the EPROM the appropriate telephone number to be dialed as well as the message to be transmitted. The transmitter and relay station are provided as customer premise equipment.

An advertisement in *Popular Science*, June 1982, entitled "Zap Your Mom", describes a table mount module associated with a telephone to automatically dial four emergency numbers and give an emergency message at the press of a button. The device is triggered either by a button on the module itself or by a button on a small pager unit adapted to be worn. The message is reproduced from a solid state voice synthesized integrated circuit and may state, for example, "Emergency. Help needed at *-**." The unit repeats the phone number of the calling party. This device is intended to alert police, fire departments and paramedics. It is also stated that other of the emergency numbers may be close relatives or a neighbor for the purpose of rendering immediate assistance while the emergency vehicles are on the way.

Jones et al U.S. Pat. No. 4,881,252 discloses a small portable transmitter which is activated in case of an emergency to either notify the warden of a prison or to call a preprogrammed number through actuation of an auto-dialer.

Phillipps U.S. Pat. No. 4,565,902 describes an alarm module having a "HELP" button which is activated in case of an emergency to effect automatic seizing of a line and dialing through an auto-dialer. The background of the invention described in this patent describes other devices of a similar nature.

Birille et al U.S. Pat. No. 4,219,698 describes an alarm system utilizing a radio transmitter in conjunction with a receiver to remotely dial a number and deliver a recorded message. The background of the invention description in this patent also references a series of patents disclosing similar systems.

Moore U.S. Pat. No. 4,237,344 discloses a health care communicator wherein a patient pushes a button on a hand held remote control to cause automatic dialing at a console unit and delivery of a prerecorded message.

LaWhite et al U.S. Pat. No. 4,491,970 describes a wristwatch or neck pendant radio transmitter for actuating a telephone emergency alarm. The radio signal actuates a residential telephone for sending an alarm to a central station in response to actuation of a switch or a call button.

Carlson et al U.S. Pat. No. 4,417,100 describes a portable radio transmitter having a distress button. Depressing the button signals a radio receiver which causes auto-dialing of a telephone a delivery of an emergency signal such as a tone.

SUMMARY OF THE INVENTION

The present invention is directed to a system and service which will provide safety, security and urgent messaging services to residential telephone customers and enhance local and state emergency services. It ensures that multiple persons will be notified in case of a medical emergency, fire, intrusion or other situations of immediate urgency at the customer's home. It offers senior citizens, dual-income families with children (particularly "latch key") children, "care givers" (son, daughter, friend, etc.) who have care giving responsibilities for the aged or handicapped, and other telephone customer's control over who is notified and the flexibility of generating their own personalized notification message. The system provides a simple, high quality, inexpensive, feature rich service which enhances the customer's safety and security, offers peace of mind, and allows family and care givers to "show they care". The system is capable of providing effective and efficient emergency alert notification and is sometimes referred to herein as an emergency alert service.

The system and service may be provided in multiple embodiments. In one embodiment, when a customer dials "911", the system simultaneously places a call to predetermined telephone numbers with a personalized message indicating that there is a potential emergency situation at the customer's residence. The "911" call continues as is conventional. The message is repeated several times to ensure the called party records the pertinent information. In the case of a busy/no answer situation, the system continues to call the numbers until a connection is made. The system may be used as a medical alert system, fire alert system, or a security system. If a medical emergency arises, a home is ablaze, or an intruder enters a home, there is often insufficient time to complete a coherent 911 call. The new system offers a simple means to simultaneously notify multiple persons of an emergency by simply dialing "911".

In a second embodiment or as a second feature of the invention, a provision is made for emergencies which do not require "911" services. According to this embodiment the customer is provided with a special 7-digit directory number. When this number is dialed the system operates as described above to notify the preselected persons but does not dial "911".

According to a still additional embodiment or feature of the invention, a remote activation button option may be provided in the form of customer premise equipment (CPE). The CPE may comprise a wristwatch, a device worn around the neck or waist, and/or a fixed unit in the home, as at bedside. Preferably the CPE is provided with two remote activation buttons, one button to activate "911" and initiate the predetermined additional notifications, and a second button which does not make the "911" call but activates the predetermined notifications.

According to a still additional embodiment or feature of the invention a battery powered mobile cellular telephone is provided with remote activation buttons for automatically actuating either a call to notify preselected persons and a call for 911 services or a call to notify preselected persons.

It is an important feature of the invention that the new system and service is combined with or "piggybacked" on equipment which is currently utilized by public telephone networks for providing enhanced voice messaging services (VMS) such as telephone answering, voice mail, call delivery, and the like. Because the new system and service permits usage of existing equipment it can be provided with a relatively moderate new capital investment and at relatively low cost to the customer.

Accordingly it is an object of the invention to provide an improved emergency, security, and urgent communication system and service which ensures that multiple persons are notified in the case of an emergency or other urgent situation.

It is another object of the invention to provide such an improved emergency, security, and urgent communication system and service which is capable of implementation with existing public switched telephone network equipment and thus is susceptible of relatively rapid installation and operation at reasonable cost and with a high degree of reliability.

Still other objects and advantages of the present invention will become readily apparent to those skilled in the art from the following detailed description, wherein a limited number of preferred embodiments of the invention are shown and described, simply by way of illustration of the best mode contemplated of carrying out the invention.

As will be realized the invention is capable of other and different embodiments, and its details are capable of modifications in various obvious respects, all without departing from the invention. Accordingly, the drawing and description are to be regarded as illustrative in nature, and not as restrictive.

BRIEF DESCRIPTION OF DRAWINGS

The invention will be more fully understood from the following detailed description taken in conjunction with the accompanying drawings, in which:

FIG. 4 is a diagrammatic illustration of additional details of one implementation of the invention;

FIG. 4A is a detailed break-out of the Voice Processing Unit (VPU) of FIG. 4;

FIGS. 5-8 are illustrations of different customer premise equipment (CPE) modules which may be used with the invention;

FIG. 9 is a diagrammatic illustration of the connection of the telephone on a customer's premise utilizing CPE devices of the type shown in FIGS. 5-8;

FIG. 10 is a diagrammatic illustration of additional details of another implementation of embodiment of the invention;

FIG. 10A is a detailed break-out of the Voice Processing Unit (VPU) of FIG. 10;

DETAILED DESCRIPTION OF THE INVENTION

Figure 1:
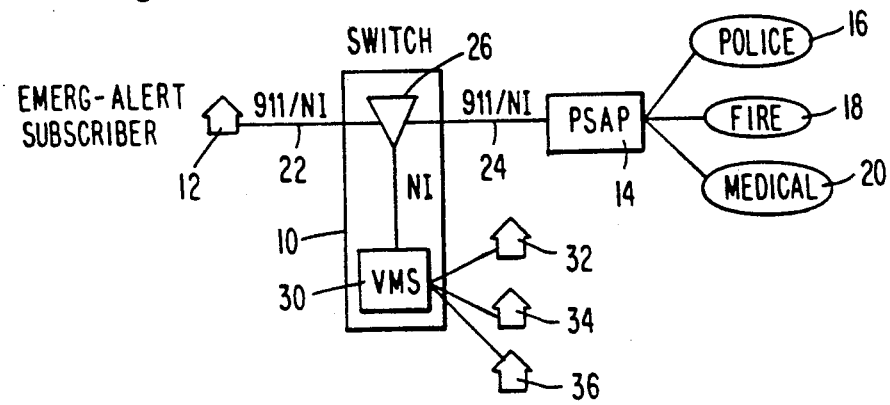
FIG. 1 is a diagrammatic illustration of a first embodiment of the invention.

Referring to FIG. 1 there is shown a program controlled electronic switch (5ESS, 1AESS, etc.) 10 connected in a public switched telephone network between a telephone station 12 and Public Service Answering Point (PSAP) 14, which is in turn connected to police, fire and medical stations 16, 18 and 20. The customer telephone station 12 is the station of a subscriber to the new service and is connected to the switch by the a local loop 22. The switch in turn is connected to the PSAP by the 911 Number Identification (911/NI) trunk 24.

The switch 10 is located at a Central Office (CO) which contains a 911/NI monitor/router 26 which is coupled to the 911/NI trunk 24. The monitor/router is a passive device which is described in further detail hereinafter. As the 911/NI trunk is monitored the monitor/router allows the 911/NI to pass through but also routes a signal via connection 28 to the Voice Messaging System (VMS) equipment 30. The monitor/router connects to a data base (not shown in this figure but explained hereinafter), other than in the VMS equipment, to screen and forward to the VMS equipment 30 only a 911/NI signal from customers who are subscribers to the new service, such as subscriber station 12. The VMS equipment 30 is modified according to the invention as is presently described. When the 911/NI signal is received by the modified VMS equipment the new emergency alert service is activated to establish connections to pre-designated stations 32-36 to be notified, as explained in further detail hereinafter.

In this embodiment (FIG. 1) the system sequentially places a call to the predetermined telephone numbers of stations 32, 34 and 36 with a personalized message indicating that there is a potential emergency situation at the subscribing customer's residence 12. The call to the 911 personnel continues at the same time as usual. The message to the designated telephone numbers is repeated several times to ensure that the called party can record the pertinent information. If no one answers or the line is busy the VMS equipment constructed according to the invention continues to call the numbers until a connection is made. After the telephone has been answered and the message has been repeated the predetermined number of times a prompt may be given directing the answering party to press the "#" key if the message has been received. Thus the delivery of the message may be confirmed.

When the particular emergency does not require 911 services the subscriber customer may dial the special seven digit emergency alert service number and the VMS equipment is then activated as described above. However the 911/NI services are not accessed.

Figure 2:
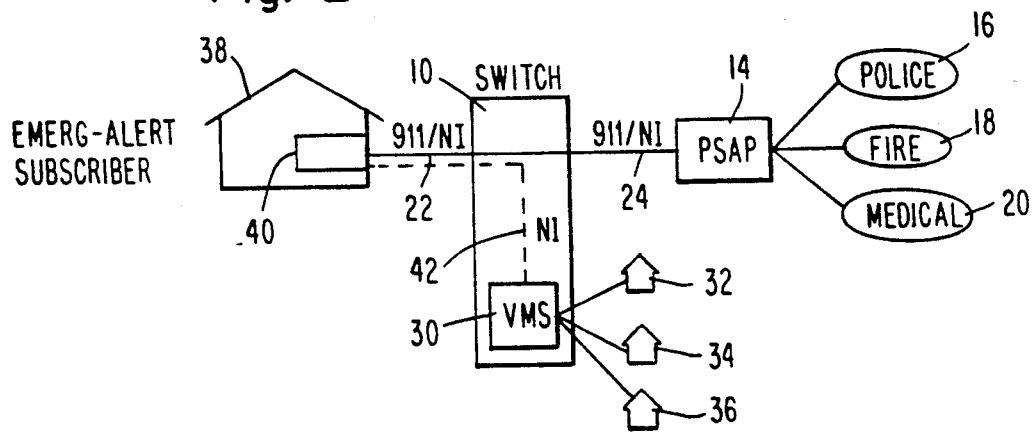
FIG. 2 is a diagrammatic illustration of another embodiment of the invention.

Referring to FIG. 2 there is shown another embodiment of the invention wherein the switch 10 is connected to the 911/NI PSAP as in the embodiment of FIG. 1. Similar reference numerals are used for corresponding elements of FIG. 2. In this embodiment of the invention the residence of a subscriber is indicated at 38 and contains a CPE receiver 40 connected by the local loop 22 to the switch 10. The VMS equipment 30 modified pursuant to the invention is provided with a directory number which provides access to and activates the emergency alert service of the modified VMS. The receiver at the customer's residence is a passive monitor device programmed to detect the dialing of 911, to await the completion and termination of that call, and to then out-dial the service activation number after the customer has disconnected from the 911 personnel as indicated by the broken connection line 42. The receiver 40 requires only a few seconds to establish a connection with the VMS equipment. After the connection is made to the VMS the receiver releases the phone line so that the customer may place other calls. The receiver can be overridden by the customer at any time after the 911/NI call has been placed. This may be done by the customer taking the phone off hook to place another call or by disabling the receiver.

Figure 3:
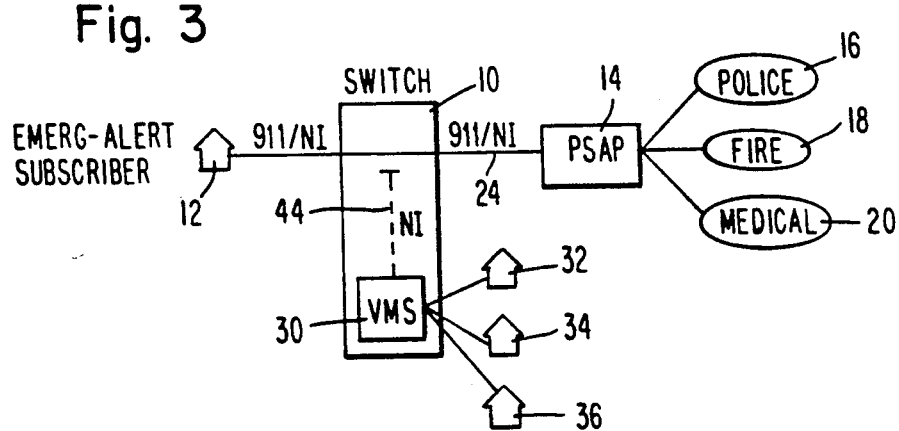
FIG. 3 is a diagrammatic illustration of still another embodiment of the invention.

Referring to FIG. 3 there is shown still another embodiment of the invention wherein corresponding reference numerals are applied to corresponding elements. When the subscriber customer 12 dials 911 the call completion to the PSAP 14 is established. After the subscriber customer has disconnected from the 911 personnel, the central office switch (5ESS, 1AESS, etc.) out dials to the modified VMS to establish a connection indicated by the broken line at 44 Alternatively the out-dialing may be simultaneous.

The emergency alert of the invention may be initiated either manually or through a CPE adjunct. In the manual format the customer or subscriber manually dials from their telephone either 911 or the special emergency seven digit number. In the CPE/automatic format a CPE module is provided. According to the invention the CPE module has two remote activation buttons, a first button which activates the new emergency alert service as well dials 911 service, and a second button which activates the new emergency alert service only. Specific embodiments of the CPE module are illustrated in FIGS. 5-8.

Referring to FIG. 5 the CPE module is provided in the form of a wristwatch 46 having a 911 button 48 and an emergency alert button 50. The wristwatch includes a small portable radio transmitter unit capable of transmitting a signal to actuate the receiver 41 illustrated in FIG. 9. Such a transmitter actuator may be of the general type described in LaWhite et al U.S. Pat. No. 4,491,970. The CPE module of FIG. 5 may have two buttons 48 and 50 along with a secondary activation button 52 which must be depressed after the 911 or emergency alert buttons 48 and/or 50 have been pressed. This prevents accidental calling of 911 or the special emergency alert number.

Referring to FIG. 6 the CPE module is shown as being provided in the form of a remote unit 54 attached to a necklace 56. The unit is provided with 911, emergency, and secondary buttons 48, 50 and 52 as described in connection with FIG. 5.

Referring to FIG. 7 there is shown a version of the CPE module in the form of a unit 58 having a belt clip 60. Again the 911, emergency and secondary buttons 48, 50 and 52 are provided.

Referring to FIG. 8 there is shown a still further variation of the CPE module in the form of a fixed remote unit 62 adapted to be placed on a table or the like, usually near the telephone. The fixed unit 62 is also provided with 911, emergency and secondary buttons 48, 50 and 52.

In all embodiments of the remote CPE unit the 911 and emergency alert buttons 48 and 50 are preferably recessed so that their surface lies below the plane of the surface of the panel in which they are mounted. This arrangement provides protection against inadvertent activation.

Referring to FIG. 9 the receiver 41 is shown connected between the subscriber telephone 64 and conventional RJ11 jack 66 and includes a first portion similar to the receiver 40 in FIG. 2 and a second portion adapted to be actuated by the CPE transmitter module described in connection with FIG. 8. Thus receiver is adapted to receive the signal from the transmitter units of FIGS. 5-8 and out-dial or actuate the 911 and/or emergency alert circuits to originate the sequences described in connection with FIGS. 1-3. Alternatively the receiver 41 may actuate the emergency alert service in response to detecting 911 dialing as in FIG. 2.

The architecture of the system of the invention as represented in FIG. 1 is illustrated in further detail in FIG. 4. Referring to that figure there is shown at 70 a customer station which represents a subscriber to the new emergency alert service. At 72 there is shown a customer station which is not a subscriber to the new service. Both stations 70 and 72 are connected to an end office (EO) 74. The end office 74 is connected by trunks 76 to a 911 tandem office or central processing site 78 for 911 calls. The 911 tandem processing site or office includes a conventional program controlled switch 80 to which the trunks 76 are connected. The other side of the switch 80 is connected via 911/NI trunks 82 through an end office 84 to the Public Service Answering Point (PSAP) 86. The PSAP 86 is in turn connected to police, fire and medical destination stations 88, 90 and 92, as described in connection with FIG. 1-3. When 911 is dialed by either station 70 or 72 the call completion to the PSAP is established by the switch 80 in the conventional manner.

Bridged to the 911/NI trunks 82 in the 911 tandem office at 94 is a monitor/router (MR) device 96. The monitor/router is bridged to the 911 trunks 82 at 94 to monitor NI of the calling number. The device monitors the trunk and does not regenerate or interrupt the 911 call. The monitor is passive and is indicated at 98. A data base of customers or subscribers to the new service is maintained within the monitor/router and is indicated at 100.

The monitor/router is connected through a network switch 102 to a voice message system (VMS) hub site 104. The switch 102, which is used for passing NI data from the monitor/router to the VMS may be co-located with the 911 tandem, co-located with the VMS hub or located elsewhere in the network. While this embodiment of the invention illustrates and describes identification of subscribers by monitoring of NI information it will be understood that other means of identification also may be utilized, such as a monitoring of a Caller ID signal.

Located at the VMS hub site 104 is a VMS platform indicated generally at 106. The VMS platform includes a master control unit (MCU) 108, digital switching system (DSS) 110 and voice processing unit (VPU) 112. The VMS platform is connected from the DSS via a T1 link 114 to a multi-line hunt group (MLHG) 116 associated with a switch 118. The monitor/router 96 is connected to the VMS platform 106 through switch 102 and through suitable modems 120 and 122 or dial out MLHG link. The switch 118 is connected through a suitable link 124 to the destination telephone stations (DTS) 126, 128 and 130 of parties designated to be notified of the emergency/safety situation. The link 124 may constitute a single line connected to a single switch port or may consist of plural lines connected to multiple ports. The system of the invention may utilize sequential or simultaneous notification of the designated parties and plural lines and ports are necessary for simultaneous notification which is preferable.

Emergency alert mailboxes provided pursuant to the invention are distinct from mailboxes configured for other applications, such as voice messaging. However, according to the preferred embodiment of the invention the emergency alert mailbox storage is provided in the same VMS platform and permits common and efficient usage of the same equipment.

The mailbox storage for the emergency alert service is provided at 111 in the VPU 112. There may be a need for additional Voice Processing Units (VPUs) used to store the additional voice and data in the VMS. VPUs may be dedicated and out dial ports and incoming ports may be prioritized for emergency alert service.

Referring to FIG. 4, when 911 is dialed, the call completion to the Public Service Answering Point (PSAP) 86 is established both for the case of a caller who is a subscriber to the new service, such as the station 70, and for a caller who is a non-subscriber, such as the station 72. Both calls proceed through the trunks 76 along with the NI signal. This information is detected by the connection at 94 and fed to the monitor 98 and both subscriber and non-subscriber 911 calls are allowed to proceed without interference or alteration. In each instance the monitor/router checks the calling number NI against the data base 100 of the new service.

If the calling number is a subscriber to the new service, the monitor/router out dials the special activation number to the VMS hub 104. The calling number's NI data is transmitted to the VMS platform 106. The VMS matches the NI to the appropriate customer's emergency alert mailbox in the storage 111 which contains that customer's notification message. The VMS then delivers the message to the phone numbers of the parties 126-130 which have been designated for notification on that subscriber's notification group list. If the calling number is not a subscriber to the new alert service the monitor/router does nothing however the call proceeds.

It is to be noted that in the arrangement of FIG. 4, which constitutes the preferred embodiment of the invention, the monitor/router is connected to monitor all outgoing 911/NI trunks. An alternate arrangement may be provided wherein the monitor/router monitors the incoming 911 trunks at the 911 tandem. However this embodiment involves setting up a new Line Class Code for the emergency service customer. All calls proceed as usual. However, when 911 is dialed, the end office translates the 911 call so that the call is sent on a separate 911 trunk group (specific to the new alert service customers) to the 911 tandem. The monitor router then monitors these incoming 911 trunks which are segregated from the non-new alert service customer 911 traffic. This embodiment requires additional 911 trunks and 911 NI monitor/router capacity.

As previously stated the outgoing calls to the designated parties may be either sequential or simultaneous. When the called telephone station goes off hook the message is repeated several times and then the recipient is asked to confirm receipt by touching a designated key such as the "#" sign. If the recipient does not have a DTMF telephone station the equipment would still deliver the message but without the receipt.

Subscribers are provided with two different access numbers, one to activate the service and the other to log in to a mailbox. The first time that a subscriber logs in to the emergency alert mailbox they are led through the initialization process described in detail hereafter. When a called party designated for notification answers, the service transmits a system prompt, such as "This is the Emergency Alert Service with an emergency message." The message is repeated a number of times so that it extends beyond the time frame of an outgoing message of a telephone answering machine. The system will redial a called party's line on a busy or no answer condition.

In the embodiment of the invention illustrated in FIG. 4 the customer number is transmitted from the monitor/router to the VMS via a modem-to-modem connection. Referring to FIG. 10 there is shown another embodiment of the invention wherein the customer number is transmitted from the monitor/router to the VMS via a multi-line hunt group (MLHG) connection. In FIG. 10 and FIG. 10A the same reference numerals are applied to designate the same elements of the system as in FIGS. 4 and 4A. In FIG. 10 a voice path is established to the VMS and the customer number is transmitted via T1 link 119 and the modem link is eliminated. The voice path is established to the VMS and the customer number is transmitted via DTMF signaling or another signaling format. In other respects the operation of the embodiment illustrated in FIGS. 10 and 10A is similar to that described in connection with FIGS. 4 and 4A.

Figure 11:
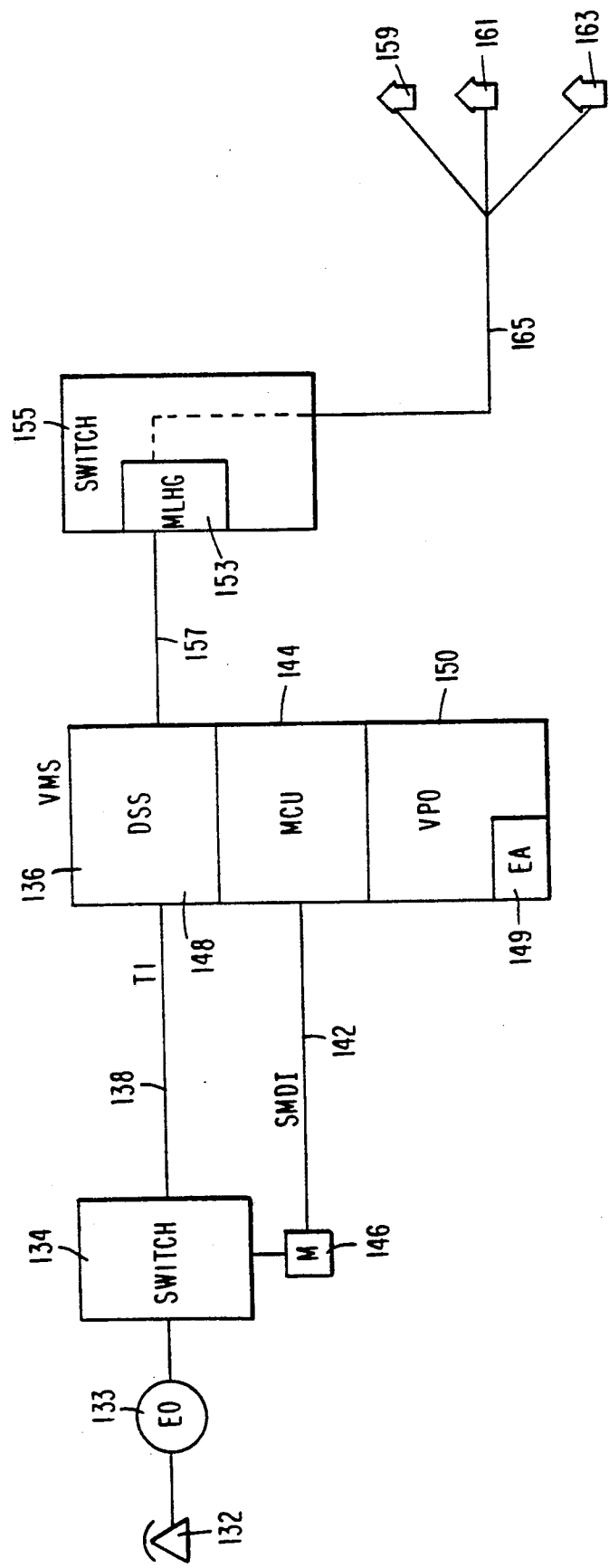
FIG. 11 is a diagrammatic illustration of another embodiment of the invention.

Referring to FIG. 11 there is shown an embodiment of the invention for providing the new alert service without the 911 option. Referring to that figure there is shown a telephone station 132 which is a subscriber to the new alert service through the End Office 133. The switch 134 is connected to the VMS platform 136 via a T1 link 138. At the same time SMDI link 142 provides SMDI data to the MCU 144 via a modem 146. The T1 signal proceeds from the DSS 148 to the MCU 144. The SMDI link 142 provides the customary SMDI data including trunk ID, calling number ID, called number ID, etc. With this information the MCU 144 may access the alert storage 149 in the VMS VPU 150.

A multi-line hunt group (MLHG) 153 associated with a switch 155 is connected to the DSS 148 at 157. A series of destination subscriber stations to be notified is shown at 159, 161, and 163. These stations are connected through a suitable line 165 to the switch 155.

While the service has sometimes been referred to as an emergency alert service it is to be understood that emergency situations need not be entailed. The messages transmitted may be urgent messages or simply messages. Thus in the case of a large family the members of the family may be the designated parties to be notified and may receive a message such as "Please call home."

A unique feature of the invention is the use of a partitioned mailbox capacity in the VMS to use existing equipment to provide economical and expedient versatility in messaging. Thus a subscriber may be provided with a partitioned mailbox which permits the storage of multiple message options. In such an arrangement the subscriber may have a menu such as "Dial 1 for a first message, Dial 2 for a second message, Dial 3 for a third message" and so on. The subscriber simply dials into the mailbox in conventional fashion and chooses the message. The use of a partitioned mailbox has the advantage of providing multiple functions using only a single address.

The system may be provided with the option of permitting the subscriber to elect to hear the message before its transmittal and then to initiate the transmittal by pressing a designated DTMF key. Likewise the system may be provided with a fail-safe feature, particularly where used for emergency messages, whereby the subscriber is presented with a prompt such as "Are you certain you want to send this emergency message? If so, press #."

The embodiments of the system and service of the invention illustrated in FIGS. 4, 10 and 11 may be provided in basic form wherein the subscriber manually dials 911 and/or the emergency alert directory number. On the other hand the system and service may be provided in a form including CPE devices of the type illustrated in FIGS. 5-8. In this embodiment the subscriber need only depress buttons on a remote unit to initiate the service. When a CPE initiation of 911 is utilized it is preferable to provide a confirmation handshake between the monitor/router and the CPE device. An LED signal may be provided on the CPE device to confirm that the monitor/router received the initiation signal. If the LED confirmation signal is not received the subscriber knows to repress or continue to press the button. A handshake may also be provided between the VMS emergency alert function and the monitor/router. This will confirm to the monitor/router that the emergency alert function has been successfully activated. If the monitor/router does not receive the handshake it continues to originate the initiation signal. For the CPE activation of the VMS emergency alert function there will be a handshake between the VMS and the CPE to confirm that the emergency alert function has been successfully activated. If the CPE does not receive the hand-shake it will go on-hook; off-hook; and call the VMS to activate the emergency alert function.

Figure 12:
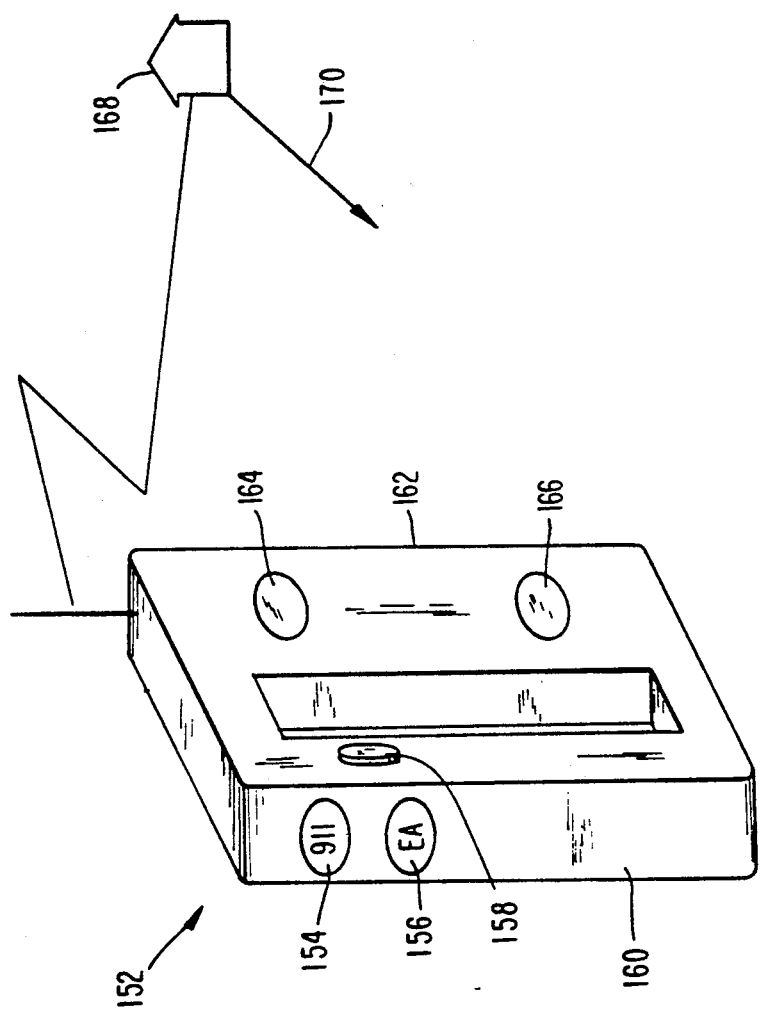
FIG. 12 is a partially diagrammatic, partially perspective view of yet another embodiment of the invention.

Referring to FIG. 12 there is shown still another embodiment of the invention. According to this embodiment a remote activating unit generally indicated at 152 is provided with a 911 button 154, an emergency alert button 156 and a secondary button 158. The remote unit 152 is constructed into the handle 160 of a mobile battery powered cellular telephone 162 having a receiver 164, voice piece 166 and DTMF keyboard (not shown). The cellular telephone communicates via radio transmission with a cellular radio switching office 168 which is conventionally connected by trunks 170 to the telephone network.

According to this embodiment of the invention the directory number assigned to the cellular telephone is that of the subscriber to the emergency alert service. In a still further modification of the embodiment of FIG. 12 the remote actuating unit 152 may be provided as a separate unit from the mobile telephone 162 in any of the forms illustrated in FIGS. 5-8. In such an embodiment the cellular telephone also includes a receiver corresponding to the receiver associated with the remote unit previously described. It will be appreciated that this embodiment of the invention provides a significant enlargement of the adaptability of the basic service to mobile sites such as automobiles, boats or pedestrians carrying the mobile telephone.

Figure 13:
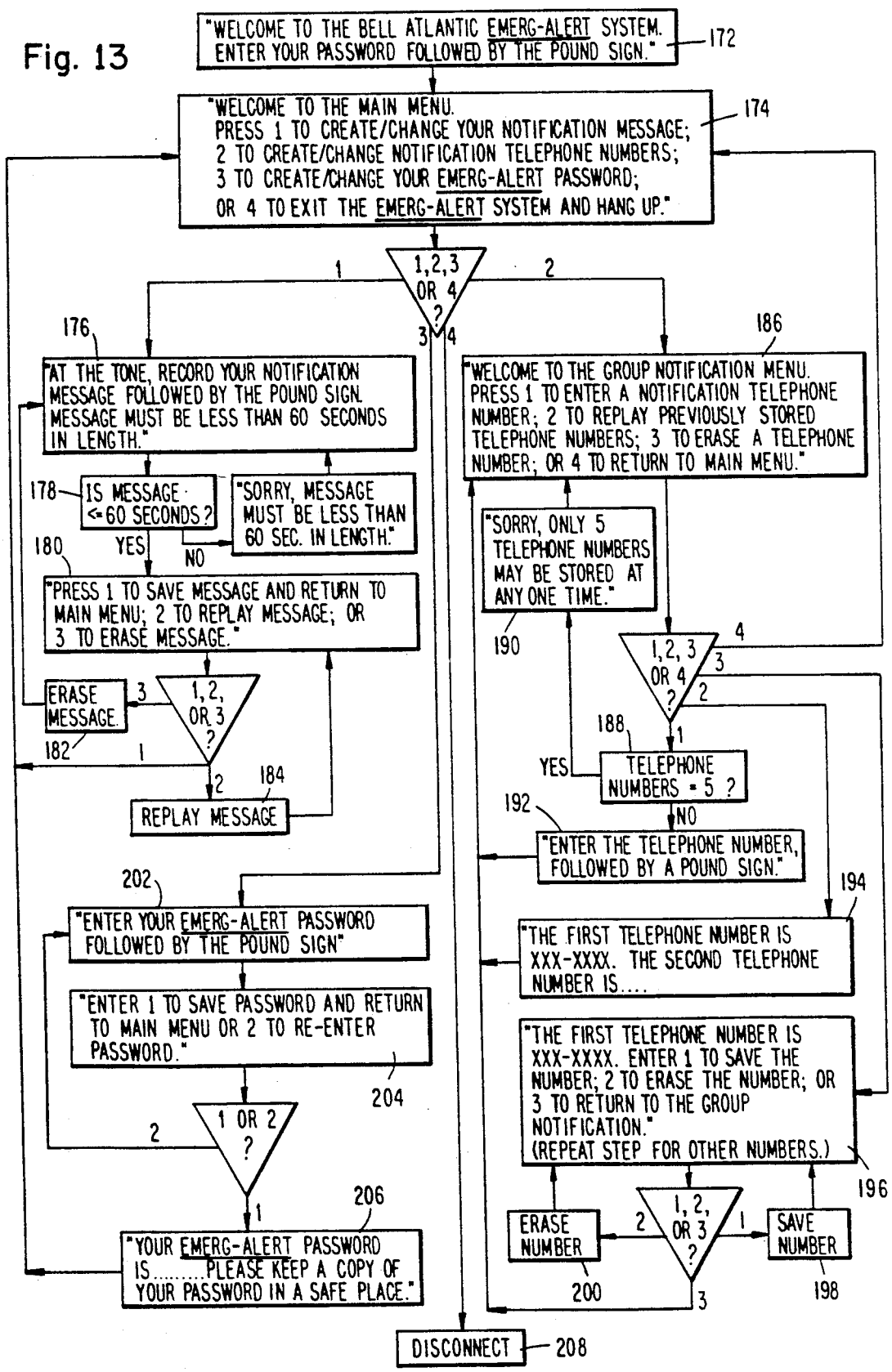
FIG. 13 is a flow chart illustrating the creation and/or changing of the mailbox or storage provided to a customer according to the invention.

Referring to FIG. 13 there is shown an illustrative flow chart illustrating a procedure for creating (initializing) or changing an emergency alert mailbox according to the invention. Referring to that Figure, the subscriber dials the seven digit service number at 172 and receives a greeting and instructions such as "Welcome to the Emergency-Alert System. Enter your password followed by the '#' sign." It will be understood that the password has earlier been created in the subscription sequence which is similar to that applicable to conventional mailboxes. The caller next proceeds to the Main Menu at 174. At this point the caller may receive a prompt such as "Welcome to the Main Menu. Press '1' to create/change your notification message; '2' to create/change notification telephone numbers; '3' to create/change your Emergency Alert password; or '4' to exit the Emergency-Alert System and hang up."

Assuming that the caller pressed "1" to create or change the notification message, he/she then proceeds to 176 and receives a prompt such as "At the tone, record your notification message followed by the '#' sign. The message must be less than 60 seconds in length." At 178 the message length is tested. If the message exceeds 60 seconds in length the caller may receive a prompt such as: "Sorry, message must be less than 60 seconds in length." If the message was less than 60 seconds the caller next proceeds to 180 to receive a prompt such as: "Press '1' to save message and return to Main Menu; '2' to replay message; or '3' to erase message." If the caller presses "3" to erase the message he/she then proceeds to 182 where the message is erased and the caller is returned to 176. If the caller presses "2" to replay the message he/she proceeds to 184 where the message is replayed and the caller is returned to the prompt 180. If the caller presses "1" to save the message he/she is returned to the Main Menu 174.

If the caller departs from the Main Menu at 174 by pressing "2" to create or change the notification telephone numbers, he/she proceeds to 186 and may receive a prompt such as: "Welcome to the Group Notification Menu. Press '1' to enter a notification telephone number; '2' to replay previously stored telephone numbers; '3' to erase a telephone number or '4' to return to Main Menu."

If the caller presses "1" to enter a notification telephone number he/she proceeds to 188 where the system tests to ensure that only five telephone numbers are stored. If the caller is attempting to store numbers in excess of five he/she proceeds to 190 and receives a prompt such as: "Sorry, only five telephone numbers may be stored at any one time." The caller is then returned to the Group Notification Menu 186. If the numbers stored are not equal to five the caller then proceeds to 192 to receive a prompt such as: "Enter the telephone number followed by a '#' sign." Following this the caller is returned to the Group Notification Menu 186.

If the caller leaves the Group Notification Menu 186 by pressing "2" to replay previously stored telephone numbers, he/she proceeds to 194 to receive a prompt such as: "The first telephone number is XXXXXXX. The second telephone number is . . . ". The caller is then returned to the Group Notification Menu 186.

If the caller departs the Group Notification Menu 186 by pressing "3" to erase a telephone number, he/she proceeds to 196 to receive a prompt such as: "The first telephone number is XXX-XXXX. Enter '1' to save the number; '2' to erase the number; or '3' to return to the Group Notification Menu." This is repeated for other numbers.

If the caller who has requested erasure of a telephone number presses "1" at 196 the number is saved at 198. If the caller presses "2" to erase the number the number is erased at 200. If the caller presses "3" he/she is returned to the Group Notification Menu at 186.

If the caller departs the Group Notification Menu by pressing "4" he/she is returned to the Main Menu at 174.

If the caller departs the Main Menu at 174 by pressing "3" to create or change his/her emergency alert password, he/she proceeds to 202 to receive a prompt such as: "Enter your Emergency Alert password followed by the '#' sign." The caller next proceeds to 204 to receive a prompt such as: "Enter '1' to save password and return to Main Menu or '2' to reenter password." If the caller presses "1" to save the password and return to the Main Menu the caller proceeds to 206 to receive a prompt such as "Your Emergency Alert password is . . . Please keep a copy of your password in a safe place." If the caller presses "2" to reenter the password the caller proceeds to 202 to receive the prompt to enter the new password. The caller then proceeds to 204 and thence to 206 to receive a prompt such as: "Your Emergency Alert password is . . . Please keep a copy of your password in a safe place." From here the caller is returned to the Main Menu at 174.

The caller may then exit the Emergency Alert System by pressing "4" and proceeding to a hang up and disconnect at 208.

Figure 14:
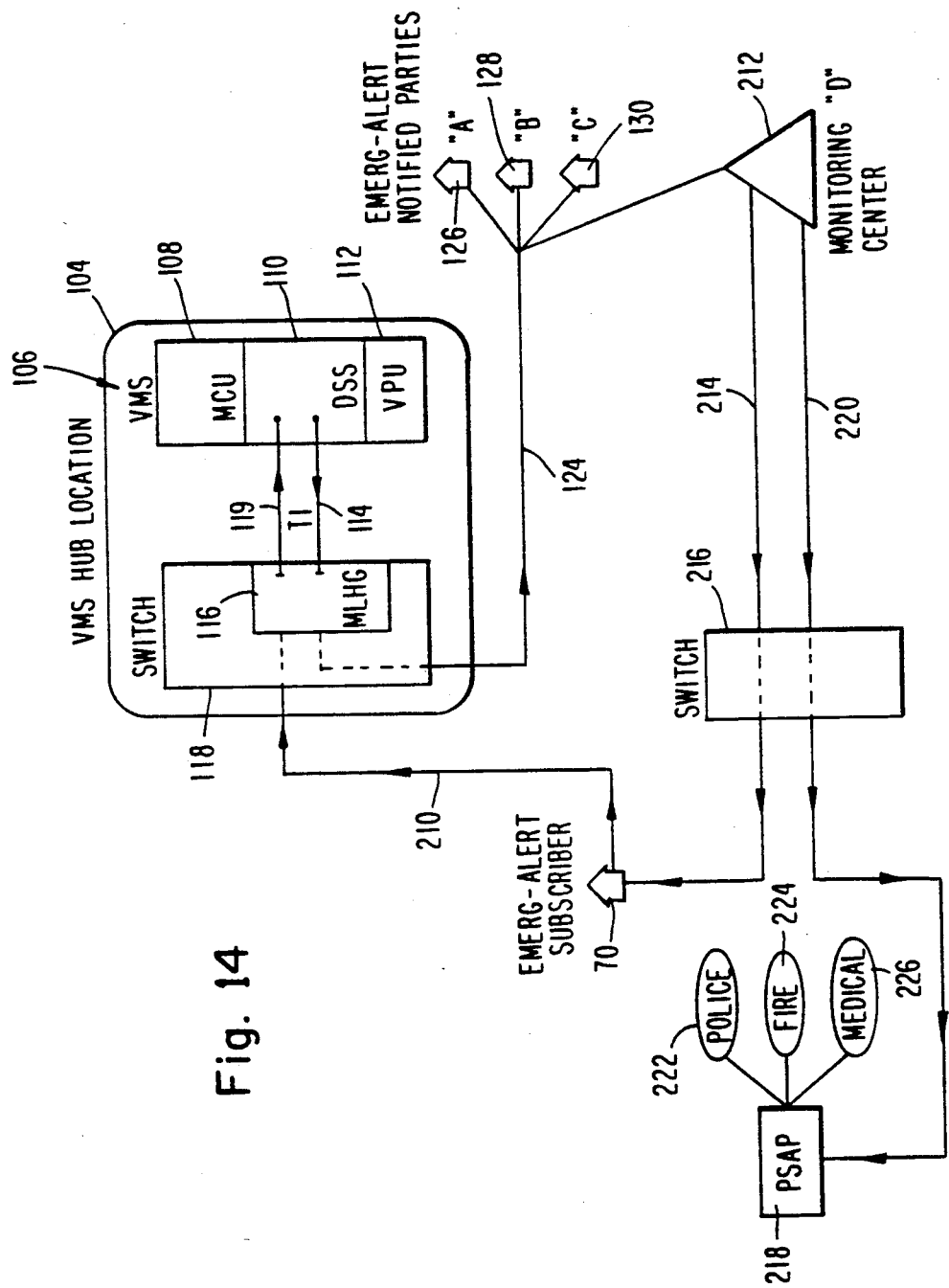
FIG. 14 is a diagrammatic illustration of still another embodiment of the invention.

Referring to FIG. 14 there is shown still another embodiment of the invention wherein there is provided a network which operates to automatically notify the customer or subscriber in the situation wherein the designated parties to be notified cannot be reached.

According to this embodiment of the invention the time period for completing the calling session is established either as a parameter of the service or as a parameter selected by the subscriber. The subscriber may also establish a failure condition which will trigger further action to complete execution of the calling session. Thus, by way of example, failure to complete any calls to any DTS within the predetermined time period may be established as the failure condition. Alternatively, failure to complete calls to a pre-designated minimum number of DTS within the time period may be established as the failure condition. As a still additional alternative failure to complete a call to a particular pre-designated DTS may be established as the failure condition. Combinations of such alternatives may also be established.

The functioning of the VMS platform as previously described accumulates the information or data regarding call completion. If comparison of this data with the failure condition parameters indicates that the failure condition has occurred the VMS initiates a call or signal to a Monitoring Center which then calls the customer/subscriber. If no one answers at the customer/subscriber number, the Monitoring Center calls the PSAP, i.e. 911 bureau, or other emergency services for that subscriber. If the subscriber answers the Monitoring Center determines what assistance is needed and contacts the appropriate PSAP, police, fire, and/or medical service.

Referring to FIG. 14 there is shown a VMS hub site 104 which includes a VMS platform indicated generally at 106. The VMS platform includes a master control unit (MCU) 108, digital switching system (DSS) 110 and voice processing unit (VPU) 112. The VMS platform is connected from the DSS via a T1 link 114 to a multiline hunt group (MLHG) 116 associated with a switch 18. The emergency alert subscriber is indicated at 70 connected to the switch 118 via link 210 which may be through an end office. The customer is connected to the VMS through the MLHG via a link 119 as described in connection with FIG. 10. The VMS is connected to the designated parties to be notified 126, 128 and 130 via link 124 as in FIG. 10. The VMS is also connected through the MLHG to a Monitoring Center 212.

If the prescribed number of connections to the designated parties 126, 128, 130 is not established, i.e., the failure condition occurs, (the number may be chosen at the option of the customer) within a predesignated period of time, the VMS calls the Monitoring Center and communicates to the subscriber's telephone number to the Monitoring Center via DTMF or other signaling format or computer generated voice. The Monitoring Center then calls the customer/subscriber via the link 214 and switch 216. If there is no answer to this subscriber call the Monitoring Center then initiates a call to the PSAP 218 via the link 220 and switch 216 or any other switch.

If the subscriber answers the call from the Monitoring Center the Monitoring Center determines from the subscriber what assistance is needed and contacts the appropriate PSAP service, police 222, fire 224 or medical 226. The communication between the Monitoring Center and subscriber may be automated through the use of suitable prompts to the answering subscriber. Thus for example, the Monitoring Center may initiate a prompt such as "This is your Emergency Alert Service. We have been unable to contact any of the parties which you designated. If you desire contact established with police press '1'; if you desire contact established with fire press '2'; if you desire contact established with medical service press '3'. If you press no key no contact will be established." If desired by the customer the Monitoring Center may be programmed to advise the subscriber which designated party has not responded.

It will be appreciated that the invention provides an improved emergency, security and urgent communication system and service which ensures that multiple persons are notified in the case of an emergency or other urgent situation. This system and service is capable of implementation with existing public switched telephone network equipment and is susceptible of relatively rapid installation and operation at reasonable cost and with a high degree of reliability.

In this disclosure there are shown and described only the preferred embodiments of the invention, but as aforementioned, it is to be understood that the invention is capable of use in various other combinations and environments and is capable of changes or modifications within the scope of the inventive concept as expressed herein.

We claim:

1. In a telecommunications system having a plurality of switch means interconnected by trunk means; a public service answering (PSA) node connected to a first of said switch means by PSA trunk means; subscriber telephone station (STS) means connected to said first switch means and connectable through said first switch means to said PSA node; voice message service (VMS) platform means including voice processing unit (VPU) means having first data storage means connected to said telecommunications system; the improvement comprising:

monitor/router (MR) means having means for detecting telephone station number identification signals coupled to said PSA trunk means to detect number identification signals carried thereby; second data storage means associated with said MR means and having data identifying said STS means stored therein;

said MR means being connectable to said VMS platform means;

said MR means detecting data identifying said STS means carried by said PSA trunk means and transmitting to said VMS platform means signals identifying said STS means;

said VPU means including third data storage means for storing data responsive to signals from said STS means, said data including the identity of destination telephone station (DTS) means to be provided with voice message data stored in said third data storage means;

and second switch means connected to said VMS platform means for receiving said voice message data from said third data storage means and delivering said voice message data to DTS means predetermined by data stored in said third data storage means by said STS means.

2. A telecommunications system according to claim 1 including portable remote actuating means having radio transmitter means and signaling button means for activating said transmitting means to transmit radiated signals; and receiver means connected to said telecommunications system and disposed proximate an associated STS means;

said receiver means including signaling means responsive to receipt of said radiated signals to cause the transmission to the telecommunications system of signals causing the voice message data stored in said third data storage means by the STS means with which said receiver is associated to be delivered to said DTS means.

3. A telecommunications system according to claim 2 wherein said portable remote actuating means includes at least two signaling buttons arranged to actuate said transmitter means to transmit either of two signals;

one of said signals causing said receiver means to transmit to said telecommunications system means a signal causing (a) connection of the associated STS means to said PSA node and (b) delivery of said voice message data to said DTS means;

said second signal causing said voice message data to be delivered to said DTS means without establishing connection to said PSA node.

4. A telecommunications system according to claim 2 wherein said button means has an upper surface recessed below the plane of the portion of said portable remote actuating means in which said button means is mounted.

5. A telecommunications system according to claim 2 including additional button means arranged so that said additional button means must be pressed following the pressing of said button means to actuate said transmitter means in said remote actuating means.

6. A telecommunications systems according to claim 1 wherein said third data storage means comprises partitioned mailbox means having stored therein multiple voice message data for an STS means.

7. In a telecommunications system having a plurality of switch means interconnected by trunk means; a public service answering (PSA) node connected to a first of said switch means by PSA trunk means; subscriber telephone station (STS) means connected to said first switch means and connectable through said first switch means to said PSA node; voice message service (VMS) platform means including voice processing unit (VPU) means having first data storage means connected to said telecommunications system; the improvement comprising:

monitor/router (MR) means having means for detecting telephone station number identification signals coupled to said PSA trunk means to detect number identification signals carried thereby; second data storage means associated with said MR means and having data identifying said STS means stored therein;

said MR means being connectable to said VMS platform means;

said MR means detecting data identifying said STS means carried by said PSA trunk means and transmitting to said VMS platform means signals identifying said STS means;

said VPU means including third data storage means for storing data responsive to signals from said STS means, said data including the identify of destination telephone station (DTS) means to be provided with voice message data stored in said third data storage means, and data establishing a failure condition;

second switch means connected to said VMS platform means for receiving said voice message data from said third data storage means and after connection to DTS means predetermined by data stored in said third data storage means by said STS means delivering said voice message data;

means in said VMS platform means for detecting the occurrence of said failure condition; and monitoring means associated with said telecommunications system;

said means for detecting the occurrence of said failure condition being connected to said monitoring means upon the occurrence of said failure condition; and said monitoring means initiating a call to said STS means following said connection; and said monitoring means on failing to complete said call to said STS means initiating and completing a call to said PSA node.

8. In a telecommunications system having a plurality of switch means interconnected by trunk means; subscriber telephone station (STS) means connected to a first of said switch means; voice messaging service (VMS) platform means including voice processing unit (VPU) means connected to said telecommunications system; said VMS platform means having first data storage means to provide voice message service responsive to said VMS platform means being accessed by an STS means and receipt of first number identification corresponding to an available VMS service; link means interconnecting said first switch means and said VMS platform means to provide to said VMS platform means the identity of an STS means calling said VMS platform means; the improvement comprising:

second data storage means associated with said VMS platform means; said second data storage means having stored therein data comprising (a) voice message data stored responsive to signals from said STS means and (b) data identifying destination telephone station (DTS) means stored responsive to signals from said STS means;

said VMS platform means responsive to access thereto by said STS means and receipt of second number identification delivering through second switch means voice message data from said second data storage means;

said DTS means being connected to said second switch means;

said voice message data being delivered to those DTS means corresponding to said data in said second data storage means identifying said DTS means;

receiver means connected to said first of said switch means and located proximate one of said STS means;

said receiver means including auto-dialer means for establishing connection between said first of said switch means and said VMS platform means; and portable remote signaling means including radio transmitter means for transmitting a signal to said receiver means to cause (a) actuation of said auto-dialer means, (b) connection to said VMS platform means and (c) delivery of said voice message data to said DTS means.

9. A telecommunication system according to claim 8 wherein said portable remote signaling means includes actuating button means, said button means being mounted in a surface of said portable remote signaling means with the upper level of the surface of said button means recessed below said surface of said portable remote signaling means.

10. A telecommunications system according to claim 9 including additional button means which must be depressed following depression of said first named button means to actuate said transmitter means in said portable remote signaling means.

11. In a telecommunications network system having a public service answering (PSA) node and switch means connected to subscriber telephone station (STS) means; network link means connecting said STS means and switch means to said PSA node; voice message service (VMS) platform means including voice processing unit (VPU) means having first data storage means connected to said telecommunications network system; the improvement comprising:

monitor/router (MR) means having second data storage means and having data identifying said STS means stored therein;

said MR means being connectable to said VMS platform means;

means for detecting the identification of STS means connected to said PSA trunk means including means for transmitting to said VMS platform means signals identifying said STS means;

said VPU means including third data storage means for storing data responsive to signals from said STS means, said data including voice message data and data identifying destination telephone station (DTS) means to be provided with said voice message data stored in said third data storage means; and switch means connected to said VMS platform means for receiving said voice message data from said third data storage means and delivering said voice message data to said DTS means predetermined by said data stored in said third data storage means by said STS means.

12. A telecommunications system according to claim 11 wherein said MR means is arranged to initiate the delivery of said voice message data to said DTS means upon the detection of the identification of STS means connected to said PSA trunk.

13. A telecommunications system according to claim 11 including means for initiating delivery of said voice message data to said DTS means without connecting STS means to said PSA node.

14. A telecommunications system according to claim 11 including:

receiver means located proximate an STS means and connected to said first named switch means;

auto-dialing means associated with said receiver means for effecting connection of said STS means to said PSA node and for initiating the delivery of said voice message data stored by said STS means to said DTS means predetermined by said STS means; and portable remote signaling means having transmitter means for controlling said auto-dialer means in said receiver means.

15. A telecommunications system according to claim 14 wherein said remote signaling means includes a first and a second actuating switch; said first actuating switch actuating said auto-dialer means to effect connection of said STS means to said PSA node as well as initiating delivery of said voice message data from said third data storage means to said DTS means; and said second switch means activating said auto-dialer means to effect delivery of said voice message data from said third data storage means to said DTS means without connection to said PSA node.

16. A method of providing emergency alert notification in a telecommunications system having a public service answering (PSA) node; switch means connected to subscriber telephone station (STS) means; network link means connecting said STS means and switch means to said PSA node; and voice message service (VMS) platform means including voice processing unit (VPU) means having first data storage means connected to said telecommunications network system comprising the steps of:

establishing in said VMS platform means second data storage capacity distinct from said first data storage means;

establishing a data base which includes the identity of STS means subscribing to the emergency alert notification service;

accessing said VMS platform means via a STS means and storing in said second storage means (a) voice message data to be delivered to destination telephone station (DTS) means, and (b) data identifying the DTS means to which said voice message data is to be delivered;

monitoring said telecommunications system for a call to said PSA node by a STS means whose identity is stored in said data base;

on detecting such a call transmitting to said VMS platform means a signal including the identity of the STS means which initiated said call to said PSA node;

transmitting to DTS means designated by the STS means which initiated the call the voice message data stored by said STS means in said second storage means.

17. A method according to claim 16 including the step of initiating a call from a STS means to said PSA node from transmitter means via receiver means connected to said switch means.

18. A method of providing emergency alert notification in a telecommunications system having a public service answering (PSA) node; switch means connected to subscriber telephone station (STS) means; network link means connecting said STS means and switch means to said PSA node; and voice message service (VMS) platform means including voice processing unit (VPU) means having first data storage means connected to said telecommunications network system comprising the steps of:

establishing in said VMS platform means second data storage capacity distinct from said first data storage means;

establishing a data base which includes the identity of STS means subscribing to the emergency alert notification service;

accessing said VMS platform means via a STS means and storing in said second storage means (a) voice message data to be delivered to destination telephone station (DTS) means, (b) data identifying the DTS means to which said voice message data is to be delivered, and (c) data establishing a failure condition;

monitoring said telecommunications system to detect the occurrence of said failure condition;

on detecting the occurrence of said failure condition initiating a call to said STS means and if said call to said STS means is completed reporting the failure condition;

if said call to said STS means is not completed initiating and completing a call to said PSA node.

* * * * *